United States Patent

[11] 3,561,730

| [72] | Inventor | Gordon F. Hurst<br>540 Callan Ave., San Leandro, Calif. 94577 |
|---|---|---|
| [21] | Appl. No. | 726,071 |
| [22] | Filed | May 2, 1968 |
| [45] | Patented | Feb. 9, 1971 |

[54] BALL VALVE CONSTRUCTION
12 Claims, 10 Drawing Figs.

[52] U.S. Cl. ............................................. 251/315, 251/152, 251/174
[51] Int. Cl. ............................................. F16k 5/06
[50] Field of Search ............................................. 251/148, 151, 160, 174, 180, 181, 315, 309, 152

[56] References Cited
UNITED STATES PATENTS

| 3,387,815 | 6/1968 | Richards | 251/315X |
| 3,439,897 | 4/1969 | Priese et al. | 251/315X |

FOREIGN PATENTS

| 896,242 | 5/1962 | Great Britain | 251/315 |
| 950,749 | 2/1964 | Great Britain | 251/309 |
| 958,832 | 5/1964 | Great Britain | 251/174 |
| 700,001 | 12/1964 | Canada | 251/315 |

*Primary Examiner*—William R. Cline
*Attorney*—Julian Caplan

ABSTRACT: A ball valve seal comprises a metallic ring having an annular plastic inset engaging the ball. The ring is biased toward the ball by a Belleville washer or the like which is backed by an end cap. Surrounding the metallic ring is a stationary outer ring, which may be of chevron construction and permits sliding of the metallic ring to accomplish a tight seal despite movements of the ball under pressure changes. Both an upstream and downstream seal is effected. Pressure relief from volitilization of liquids trapped within the body around the ball is provided by momentary deflection of the plastic inset on the upstream side.

PATENTED FEB 9 1971

INVENTOR.
GORDON F. HURST

BY *Julian Caplan*

ATTORNEY

INVENTOR.
GORDON F. HURST
BY Julian Caplan
ATTORNEY

INVENTOR.
GORDON F. HURST

ATTORNEY

INVENTOR
GORDON F. HURST
BY Julian Caplan
ATTORNEY

BALL VALVE CONSTRUCTION

This invention relates to a new and improved ball valve construction.

A principal feature of the invention relates to a valve seat for sealing the valve body to the ball turntable therein. The seat comprises two members, an outer member fixed relative to the body and an inner member slidable relative to the outer member. A belleville washer or other resilient means biases the inner member toward the ball. The inner face of the inner member is recessed to receive an annular plastic inset which engages the ball. In valves of this type the ball may move a short distance axially of the valve body in either direction, depending upon the side from which the high pressure is supplied. In accordance with this invention, the plastic inset seals against the ball on both the upstream and downstream sides regardless of the direction of movement of the ball.

The sliding fit between the two members of the seat permits tight sealing against the ball while the latter turns and also accommodates shifting of the ball as a result of pressure differentials. The outer member seals against the body and against the inner member while still permitting such shifting. The metallic inner member accepts the axial force of the resilient biasing means, but the flexible inset in the inner member insures a tight seal against the ball.

A particular feature of the invention is the fact that by reason of the upstream and downstream seats, the space in the valve body outside the ball and between the seats is, except as hereinafter explained, sealed against line pressure, and this permits the stem packing to be adjusted or changed while the valve is under pressure and either open or closed.

A further features of the invention is the fact that the seat construction hereinafter described in detail is particularly useful where temperature changes may cause increases in pressure tending to destroy the valve. Although the space in the body surrounding the ball is generally sealed, provision is made when pressures become excessive as a result of temperature or other changes for release of gas or liquid trapped in such space. This feature of the invention is particularly important when a volatile liquid, such as propane or anhydrous ammonia, is being handled. If such liquids become trapped in the confined space mentioned, as the temperature rises the pressure increases greatly and unless relieved, damage may occur. By reason of the seat construction of this invention, when the pressure of gas and liquid trapped in such space becomes excessive, the seat on the high pressure (upstream) side flexes away from the ball for a time period sufficient to allow the pressure in the space to equalize with the upstream pressure.

A particular features of the seat construction hereinafter described is the fact that it is self-compensating for wear, seals tightly and yet permits the ball to open and close easily. This permits long service life of the valve.

Another feature of the invention is the packing gland construction. The packing gland is bolted to flanges on end caps installed on either end of the valve body. This construction facilitates assembly of the valve body, end caps and packing gland. An advantage of this construction is the flexibility of the design of accessories for the valve, such as locking handles, air and electric motor operators, self-closing handles, and the like.

One feature of the invention is the fact that the attachment of the valve body to the end flanges eliminates the necessity of a union in the line and further makes it possible to removed the valve from the line for service easily without disturbing the rest of the piping by simply removing the bolts from the flanges and packing glands. Adjustment of the packing gland nuts to tighten the stem packing to compensate for wear is likewise readily performed. The packing gland rings can be replaced with the valve in either full open or full closed position while the valve is in service.

Ball valve seats are preferably flexible and resilient in order to seal properly and this has led to use of plastic materials such as Teflon, Nylon, Kynar and the like. However, to insure a good seal, the ball must compress both the upstream and downstream seals at the same time, and as the seats wear a tendency to leak develops. To overcome this tendency, others have developed lip seals, but such seals after prolonged use are subject to "cold flow"—a change in shape and configuration—which deforms and makes the seal nonpermanent.

The present invention uses metal seat retainers which are movable in the body and cannot be deformed by external forces and thus do not change during use. Plastic seats retained within the metal retainers continue to seal under all conditions until completely worn out.

Still another feature of the invention relates to the valve stem seal. A machined V on a portion of the stem imbeds itself into a plastic washer to produce a chevron effect. This reduces the torque required to operate the valve and improves sealing.

Other objects of the present invention will become apparent upon reading the following specification and referring to the accompanying drawings in which similar characters of reference represent corresponding parts in each of the several views.

Figure 3:
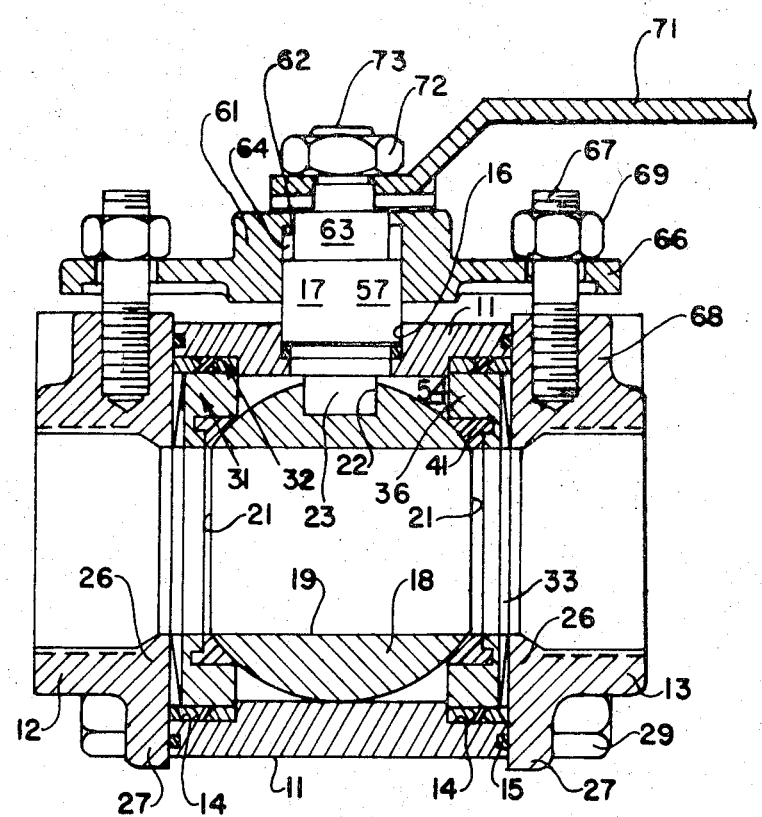
FIG. 3 is a longitudinal vertical sectional view showing the valve open.

Tubular body 11 is provided at either end thereof with end caps 12, 13 of suitable metallic material. Annular grooves in the ends of body 11 receive packing 15 which seals the body and ends together. Body 11 is generally cylindrical, formed with internal annular recesses 14 at either end. An opening 16 is formed in the top to receive stem 17, hereinafter described in detail. Within the interior of body 11 is a ball 18 having a nominal inside diameter port 19 which is determinative of the valve size. Port 19 extends from end-to-end of ball 18 and the ball is truncated at either end in parallel planes, as indicated by reference numerals 21, so that the overall length of ball 18 in the open position of FIG. 3 is slightly less than the overall length of body 11. In the top of ball 18 is a noncircular recess 22 to receive noncircular complementary extension 23 of stem 17, so that by turning stem 17 the ball 18 is turned between open and closed positions. It is a characteristic of the type of valve herein illustrated that when the ball 18 is in closed position, ball 18 is displaced within body 11 toward the right or downstream or low pressure side. This feature is illustrated schematically in FIG. 4, wherein it is assumed that upstream pressure from the left has caused ball 18 to be displaced to the right of neutral or nonpressure position.

Caps 12, 13 have inward facing flanges 26 abutting the ends of body 11 and are formed with ears 27 which are apertured to receive clamping bolts 28 tightened by means of nuts 29. By tightening nuts 29 the flanges 26 may be drawn against the ends of body 11, packing 15 accomplishing a tight seal.

The seal of body 11 to ball 18 is accomplished by inner seal 31, outer seal 32 and Belleville washer 33. Inner seal 31 comprises a metal ring 36 formed with a rabbet 37 at its inner corner. The rabbet is modified by an axially directed annular groove 38 which has an outside diameter equal to that of rabbet 37. Fitting into rabbet 37 and groove 38 and retained thereby to form a unit with ring 36 is flexible annular plastic sealing inset 41 formed of Teflon or similar flexible material. Inset 41 has an annular tongue 42 which fills groove 38 and a body 43 which fits into rabbet 37. The corner 44 of inset 41 is of spheroidal shape engaging ball 18. Corner 44 seals against ball 18 but is sufficiently resilient to accommodate variations in movement of the ball, as hereinafter described. Tongue and groove 42, 38 are mutually cooperable to maintain inset 41 and ring 36 as a unit.

Figure 5:
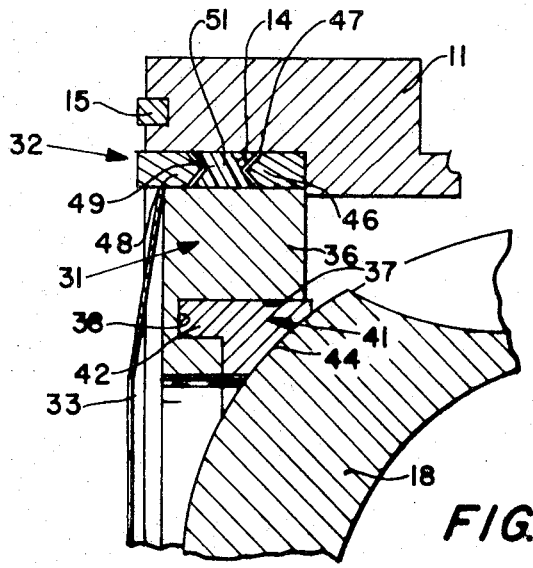
FIG. 5 is a further enlarged sectional view of the seal prior to installation of the end cap.

Outer seal 32 is preferably of a three-piece chevron type. The inner annular part 46 is of metal, fitting of the inside of recess 14 and having a triangular edge 47. Outer annular part 48 has a similar but oppositely disposed triangular edge 49 and is also of metal. The center annular part 51 is of a plastic such as Teflon and is grooved to receive edges 47 and 49. The overall width of seal 32 is greater than that of recess 14 (see FIG. 5) prior to attachment of end caps 12 and 13. Hence when the cap 12 or 13 is drawn against body 11, ring 48 is pushed inward, compressing and distorting flexible ring 51. Thus ring 51 seals against recess 14 (and thus body 11) and also seals against ring 36 of inner seal 31. However, inner ring 36 can slide relative to outer seal 32 in an axial direction.

Belleville washer 33 is compressed between cap 12 or 13 and ring 36, its larger diameter bearing against ring 36. When the end caps are drawn tight, washer 33 resiliently biases ring 36 toward ball 18, compressing inset 41 against the surface of the ball.

Figure 4:
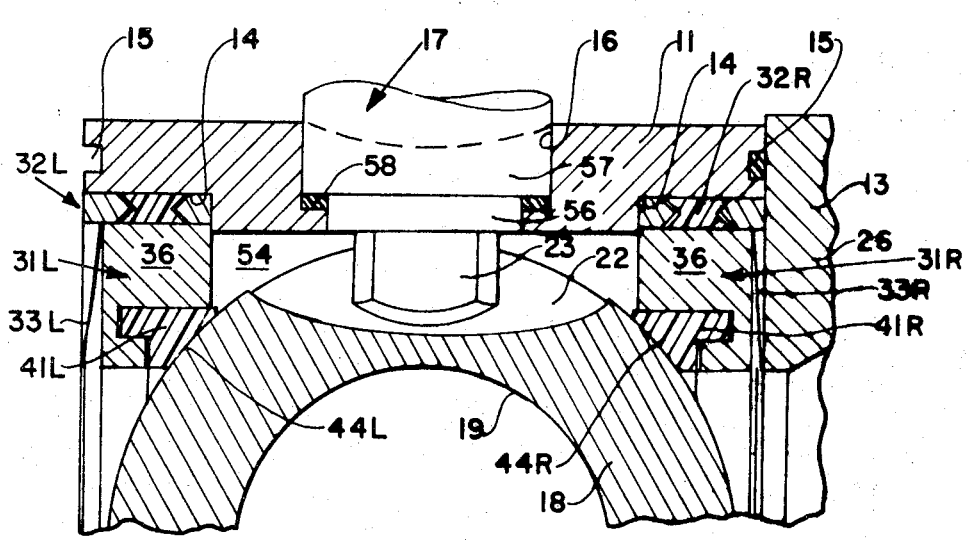
FIG. 4 is an enlarged sectional view showing the valve closed and sealed against upstream and downstream pressure.

When the valve is closed, ball 18 is displaced towards the downstream side (i.e., to the right as illustrated in FIGS. 3 and 4) and surface 44R seals against the downstream surface of ball 18 to perform a downstream seal of body 11 and of ball 18. The right-hand washer 33 is further compressed and surface 44R distorted to permit this movement. Inner seal 31R moves to the right relative to stationary outer seal 32R. At the same time, the upstream seal 31L under urging of washer 33L also move to the right so that surface 44L continues to engage the ball. Since inset 41 is resilient, surfaces 44L, 44R are in continuous annular engagement with the exterior of ball 18 when the valve is in open or closed or intermediate position and whether the upstream pressure is at either end, i.e., as in apparent from FIG. 4, despite the fact that ball 18 has been displaced toward the right by reason of the difference in pressure between the two sides of the valve.

A features of the invention is the relief against a buildup of pressure within body 11. Thus it will be seen that there is a space indicated by reference numerals 54 which, in the closed position of the valve shown in FIG. 4, is normally sealed off both from the upstream and downstream side of the valve by insets 41. Where a liquid which is highly volatile, i.e., anhydrous ammonia, liquified petroleum gas, and the like, is trapped in space 54, as the temperature rises the pressure builds up materially. Such a condition is dangerous. It may cause the stem seals to fail and may even cause a rupture of the valve body itself. An important feature of the invention is the fact that when the pressure in space 54 builds up in excess of the upstream pressure, the upstream pressure, the upstream inset 41L (i.e., the seal on the left of FIG. 4) flexes at least momentarily to permit separation of surface 44L from ball 18 and relief of the pressure within space 54 to equalize said pressure with the upstream pressure of the line. Such relief is repeated whenever pressure in space 54 becomes excessive. The relief is toward the upstream side because surface 44R is in closer contact with ball 18 than is surface 44L.

A further seal is provided for stem 17. Thus a restricted diameter portion 56 is formed intermediate the maximum diameter portion 57 and the extension 23 and surrounding said portion 56 is a thin annular seal 58 which fits into the bottom of recess 16. Downward pressure of portion 57 against the top of seal 58 deforms the seal member 58 to perform the sealing function. The downward pressure on stem 17 is applied through a stabilizer 61 formed with a recess 62 receiving portion 63 of stem 17 and having an annular seal 64 therein acting as an antifriction bearing. Seals 58, 64 are preferably of Teflon or equivalent plastic material.

Figure 7:
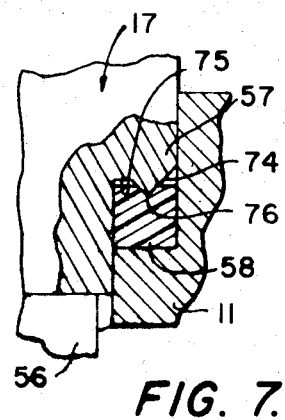
FIG. 7 is an enlarged fragmentary sectional view of a portion of a stem and packing.

FIG. 7 shows a preferred feature of the stem packing. The underside of maximum diameter portion 56 is formed with a beveled corner 74 and inside the corner is an undercut 75, leaving a V-shaped annular projection 76 on the bottom of portion 56 which imbeds itself into seal 58.

Extensions 66 of stabilizer 61 extend toward either end of the valve and are apertured for stud bolts 67 which are threaded into bosses 68 in caps 12, 13. By tightening nuts 69 the stabilizer 61 may be drawn down against the top of stem portion 57 to apply pressure on seal 58 and thus tighten the packing gland. The upper end of stem 17 is connected to a handle 71 held in place by means of nut 72 on the threaded upper end 73 of stem 17.

It will be seen that when it is necessary to replace the seal while the valve is in operation, it is merely necessary to remove nuts 68 and lift stabilizer 61 and stem 17. This does not result in any leakage of the valve under normal operating conditions, since the valve is sealed both upstream and downstream.

A further feature of the invention is the fact that the valve member may easily be removed from the line without disturbing attachment of caps 12, 13 to the pipes to which they are connected. It is merely necessary to remove nuts 69 and bolts 28. Thereupon the valve body 11 may be lifted from between flanges 26 of caps 12, 13.

Figure 6:
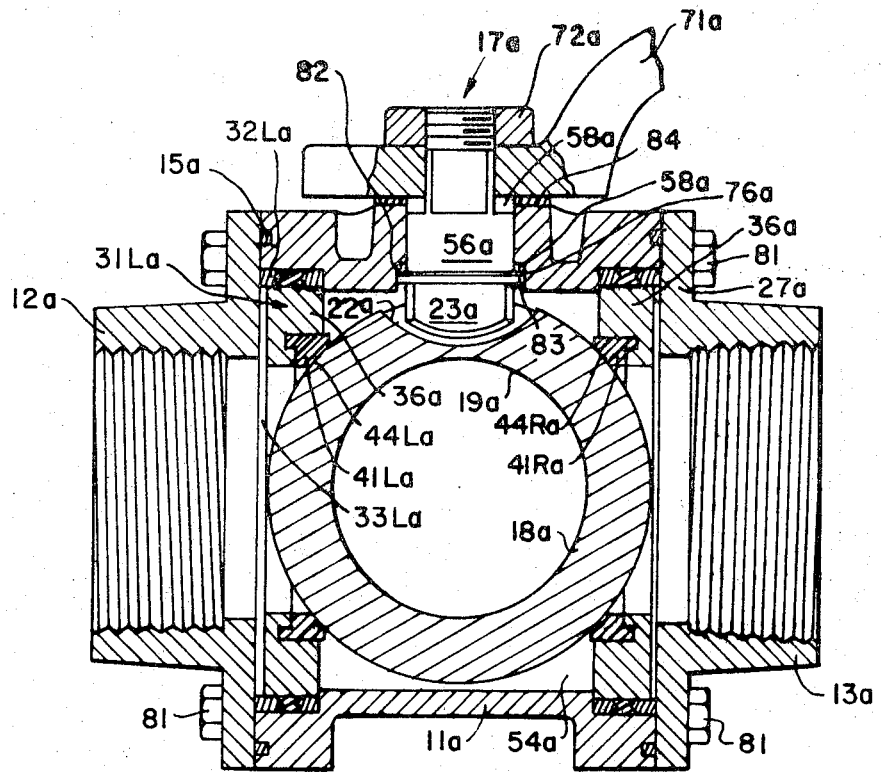
FIG. 6 is a view similar to FIG. 3, of a modified structure.

A modified construction is shown in FIG. 6, many of the parts being the same as in FIGS. 1—5. Corresponding parts are designated with the same reference numeral followed by the subscript *a*. In this modification, flanges 27*a* of caps 12*a* and 13*a* are bolted to body 11*a* by bolts 81. The top of body 11*a* is formed with an undercut bore 82. Immediately above extension 23*a* is an integral collar 83, the upper side of which is formed with an annular projection 76*a* which imbeds into seal 58*a* which fits through the bottom into undercut 82. Spacer washer 84 is interposed between the underside of handle 71*a* and the top of body 11*a*. Thus when nut 72*a* on the threaded upper end of stem 17*a* is tightened, collar 83 and its projection 76*a* compress seal 58*a* to seal the stem. This structure produces a "Chevron" action reducing the torque required to turn the valve as well as improving sealing.

Figure 8:
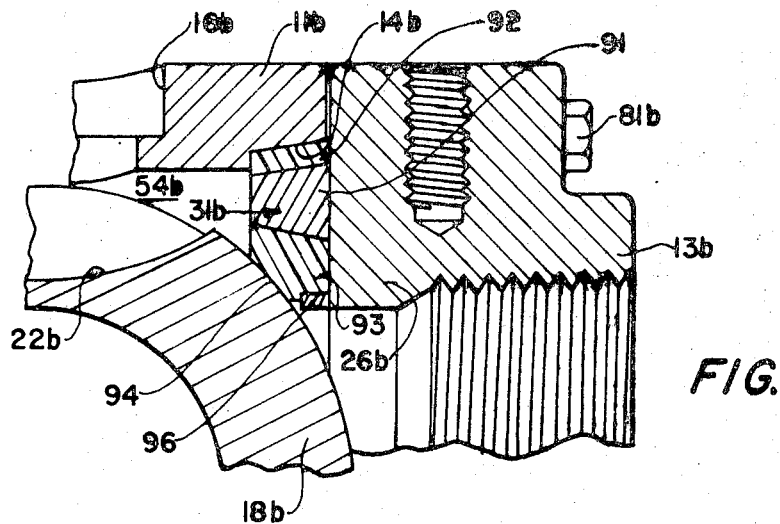
FIGS. 8, 9 and 10 are fragmentary views similar to FIG. 5 of modifications.

Directing attention to FIG. 8, seal 31*b* is of a wedge construction. Annular metal ring 91 tapers both internally and externally and is positioned with its thicker end outermost. Metal ring 91 is surrounded by outer plastic ring 92 (of Teflon or other suitable material) the inside diameter of which is complimentary to the exterior of ring 91 and the outer diameter of which is parallel thereto. Ring 92 is installed in groove 14*b* in the end of body 11*b*, groove 14*b* being tapered complementary to ring 92.

Fitting inside ring 91 is inner plastic ring 93 (of material similar to ring 92) which has an outside diameter complementary to the inside of ring 91 and has its inner corner 94 beveled at an angle of about 45° and is tangent to the surface of ball 18*b*. The outer end of the ring is formed with a groove to receive metal stiffener ring 96, which is rectangular in cross section.

Figure 1:
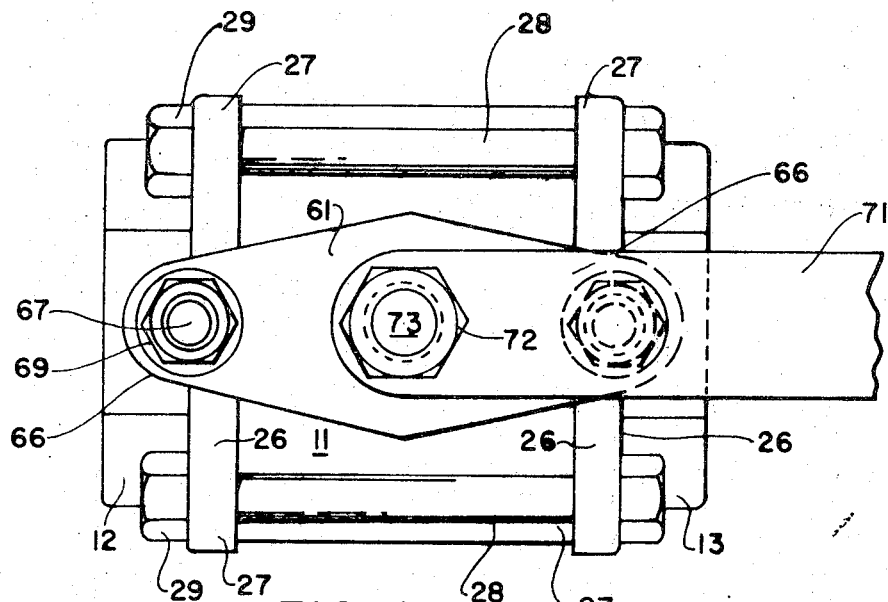
FIG. 1 is a top plan of one form of valve constructed in accordance with the present invention.
Figure 2:
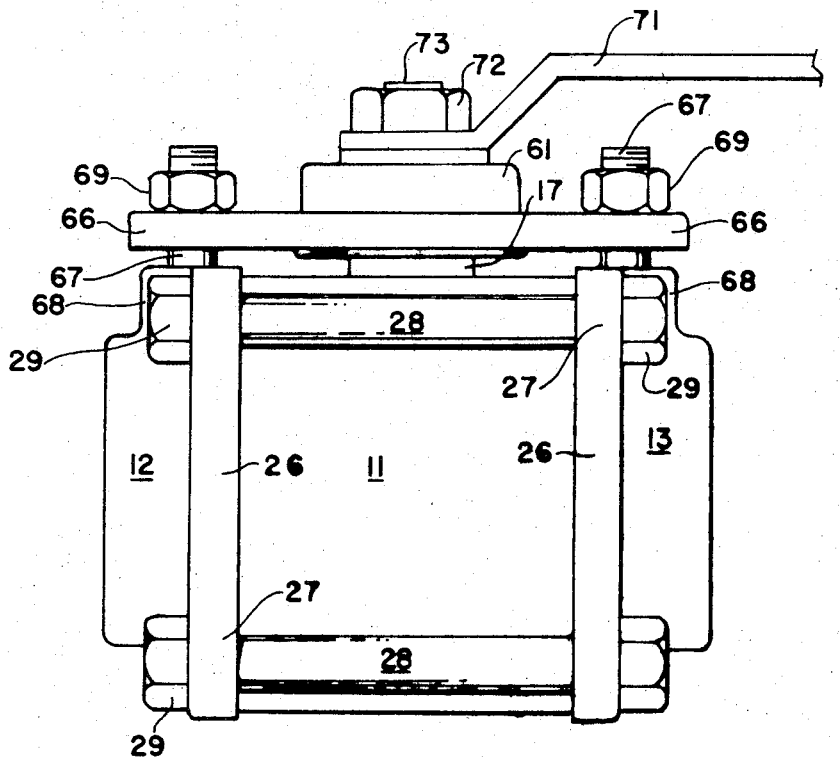
FIG 2 is a side elevation thereof.

In other respects, the construction of FIG. 1 resembles that of FIGS. 1—5 and corresponding parts are designated with the same reference numeral, followed by subscript *b*. In operation, as the end cap 13*b* is drawn tight, wedge ring 91 is pushed inward, ring 92 tending to hold its position but being somewhat expanded and serving to seal cap 13*b* to body 11*b*. The major effect of tightening, however, is to force inward and expand ring 93. Because of stiffener 96 resisting such expansion, the beveled corner 94 seals against ball 18*b*. Movement of ball 18*b* axially of the valve is accommodated by deformation of ring 94.

Figure 9:
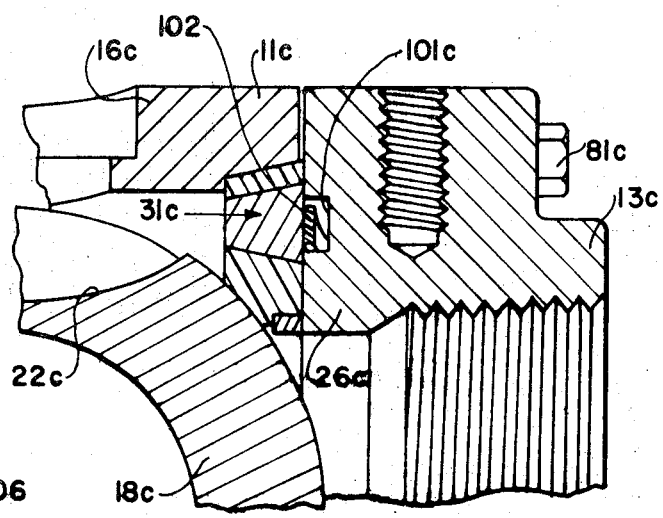

FIG. 9 is similar to FIG. 8 and corresponding parts are designated with the same reference numerals followed by subscript *c*. In this form, an annular groove 101 is formed in the inner face of cap 13*c* opposite the outer or broad end of wedge ring 91*c*. Within groove 101 is a sinuous spring washer 102. Washer 102 bears against and forces ring 91*c* inward. The advantage of this construction is the greater flexibility of movement of ring 91*c* to accommodate wear, turning of the ball, pressure changes and lessening of the need for frequent tightening of the bolts holding end cap 13*c* in place.

Figure 10:
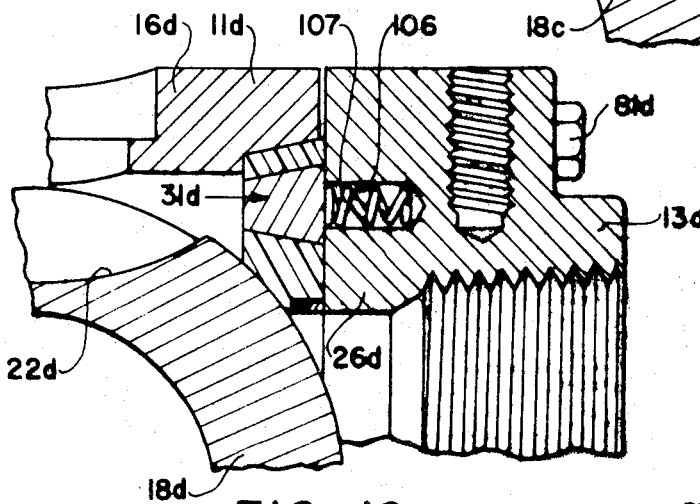

FIG. 10 is similar to FIG. 8 and corresponding parts are designated with the same reference numerals followed by subscript *d*. In this form, a series of longitudinal holes 106 is drilled in the inside face of cap 13*d* opposite the outer end of ring 91*d*. Helical springs 107 are installed in holes 106, bearing against and forcing inward ring 91*d*.

I claim:

1. A ball valve comprising a generally tubular body, a ported ball rotatable within said body, a stem projecting outside said body and turnable to turn said ball between open and closed positions, and at least one ball seal within said body to seal against said ball, said ball seal comprising an annular outer seal fixed relative to said body and sealing thereagainst, an annular inner seal slidable axially relative to said outer seal, said inner seal comprising a metal ring formed with a rabbet at the corner of said ring nearest said ball and a groove in said rabbet extending away from said ball in a substantially axial direction and a flexible annular insert formed to fill said rabbet and said groove and to extend beyond said ring to fit against said ball, said insert being surrounded by said ring on the outside of said insert and also on the edge of said insert opposite said ball, resilient means biasing said ring toward said ball and sealing said insert against said ball, and abutment means against which said resilient means and said outer seal abut, said outer seal having a compressible resilient portion which, when said outer seal is compressed by said abutment means, seals said inner and outer seals together while permitting axial movement of said inner seal under influence of said resilient means.

2. A valve according to claim 1, in which said ball is movable longitudinally of said body under influence of pressure differential on opposite sides of said valve when said valve is closed, said valve having ball seals on both sides of said ball, said inner seal on the downstream side engaging said ball, said inner seal on the upstream side flexing inward to maintain circumferential annular sealing contact with said ball.

3. A valve according to claim 2, wherein a space is pressure-isolated within said body between said insets outside said ball, at least one said inset being flexible to vent said space to the upstream side of said ball when pressure in said space substantially exceeds upstream pressure.

4. A ball valve according to claim 1, in which said inner seal comprises a metallic ring formed with a rabbet at its corner nearest said ball, said inset fitting in said rabbet and having a spheroidal surface engaging said ball, said ring and inset having mutually cooperable tongue and groove portions to maintain said inner seal as a unit.

5. A ball valve according to claim 1, in which said outer seal has at least three abutting members, the center member being flexible deformable under axial pressure to distort radially to seal against both said body and said inner seal.

6. A ball valve according to claim 1, in which said resilient means is a Belleville washer of an outside diameter less than the inner diameter of said outer seal.

7. A valve according to claim 1, in which said body is formed with a stepped aperture for said stem, a sealing ring in said aperture, said stem formed with an enlargement outward of said sealing ring to apply compression to said sealing ring to seal said stem relative to said body, an apertured compression member on the exterior of said body receiving said stem and bearing against said enlargement and adjustable means for moving said compression member relative to said body to vary compression of said enlargement on said sealing ring.

8. A valve according to claim 7, in which said adjustable means comprises threaded members engaging said abutment means and said compression member.

9. A valve according to claim 8, which further comprises means for drawing said abutment means inward of said body, comprising longitudinal bolts external of said body, whereby upon disconnecting said bolts and said threaded members said body may be removed from between said abutment means to obtain access to said stem sealing ring without disturbing the position of said abutment means relative to piping attached to said abutments means.

10. A valve according to claim 1, in which said body is formed with a stepped aperture for said stem, a sealing ring in said recess, said stem formed with an enlargement, said enlargement formed with an annular, V cross section projection engaging said sealing ring, means on the exterior of said body engaging said stem to move said stem axially to adjust the sealing force of said projecting against said sealing ring.

11. A ball valve comprising a generally tubular body, a ported ball rotatable within said body, a stem projecting outside said body and turntable to turn said ball between open and closed positions, and at least one ball seal within said body to seal against said ball, said ball seal comprising an annular outer seal fixed relative to said body and sealing thereagainst, an annular inner seal slidable axially relative to said outer seal, said inner seal having a flexible insert positioned to seal against said ball, resilient means biasing said inner seal against said ball, and abutment means against which said resilient means and said outer seal abut, said outer seal having a compressible resilient portion which, when said outer seal is compressed by said abutment means, seals said inner and outer seals together while permitting axial movement of said inner seal under influence of said resilient means, said inner seal comprising a metallic ring tapering inward on both its outside and inside diameters, said insert having its outside diameter abutting and complimentary to the inside diameter of said metallic ring, said outer seal being a ring of substantially uniform thickness tapering parallel to the outside diameter of said metallic ring.

12. A valve according to claim 11, in which said abutment means is formed with at least one aperture opposite the broad end of said metallic ring and which further comprises resilient means in said aperture bearing against said metallic ring to force said insert toward said ball.